United States Patent [19]

Funahashi et al.

[11] Patent Number: 4,696,869

[45] Date of Patent: Sep. 29, 1987

[54] MAGNETIC RECORDING MEDIUM

[75] Inventors: Masaya Funahashi, Osaka; Teruhisa Miyata, Kyoto; Kenichi Inoue, Muko; Akira Miyake, Kyoto, all of Japan

[73] Assignee: Hitachi Maxell, Ltd., Osaka, Japan

[21] Appl. No.: 833,200

[22] Filed: Feb. 27, 1986

[30] Foreign Application Priority Data

Feb. 27, 1985 [JP] Japan ................................. 60-38355

[51] Int. Cl.$^4$ ................................................. G11B 5/71
[52] U.S. Cl. .................................. 428/695; 252/62.54; 427/128; 427/131; 428/328; 428/329; 428/694; 428/900
[58] Field of Search ............... 428/695, 694, 329, 900, 428/328, 425.9; 427/128, 131; 252/62.54; 360/134–136

[56] References Cited

U.S. PATENT DOCUMENTS

| 4,247,407 | 1/1981 | Naruse | 428/695 |
| 4,414,289 | 11/1983 | Shibata | 428/695 |
| 4,522,885 | 6/1985 | Funahashi | 428/422 |
| 4,539,266 | 9/1985 | Miyazaki | 428/695 |
| 4,554,220 | 11/1985 | Yamamoto | 428/695 |
| 4,647,502 | 3/1987 | Miyake | 428/695 |

FOREIGN PATENT DOCUMENTS 0201526 10/1985 Japan ................................. 428/694

Primary Examiner—Ellis P. Robinson
Attorney, Agent, or Firm—Birch, Stewart, Kolasch & Birch

[57] ABSTRACT

A magnetic recording medium improved in durability at an elevated temperature which comprises a substrate and a magnetic layer comprising magnetic powder and a resinous binder formed on the substrate, characterized in that the magnetic layer further comprises an ester of a polyvalent alcohol with a fatty acid in an amount of 0.01 to 40 parts by weight to one part by weight of the magnetic powder.

11 Claims, No Drawings

MAGNETIC RECORDING MEDIUM

BACKGROUND OF THE INVENTION

This invention relates to a magnetic recording medium having improved durability at an elevated temperature.

In magnetic recording media such as magnetic disks, magnetic tapes and magnetic sheets prepared by applying a magnetic coating composition comprising magnetic powder, a resinous binder and an organic solvent onto a substrate such as a polyester film to make a magnetic layer, the magnetic layer is apt to be worn away due to its contact with a magnetic head as well as a pad under a large velocity at recording and reproducing. Thus, development of a magnetic recording medium excellent in wear-resistance and durability has been highly desired.

For this purpose, it has already been proposed to incorporate a variety of lubricants into the magnetic layer. A typical example of such lubricants is an ester of a monovalent alcohol with a fatty acid. In fact, the incorporation of such an ester can surely improve the wear-resistance to a certain extent at low temperatures but does not improve the wear-resistance at high temperatures.

SUMMARY OF THE INVENTION

As a result of extensive study for overcoming such a drawback, it has now been found that the incorporation of an ester of a polyvalent alcohol with a fatty acid into the magnetic layer is highly effective in improvement of the wear-resistance, particularly at elevated temperatures. Thus, the incorporation of such a polyvalent alcohol fatty acid ester can provide a magnetic recording medium excellent in durability even when used at such a high temperature as about 40° C. This invention is based on the above finding.

Accordingly, a main object of the present invention is to provide a magnetic recording medium comprising a substrate and a magnetic layer comprising magnetic powder and a resinous binder formed thereon, characterized in that the magnetic layer further comprises an ester of a polyvalent alcohol with a fatty acid as a lubricant.

As the polyvalent alcohol fatty acid ester, there may be employed any ester between a polyvalent alcohol and a faty acid. The polyvalent alcohol portion is preferred to have a carbon content of from 2 to 30 carbon atoms, while the fatty acid portion is preferred to have a carbon content of from 8 to 30 carbon atoms. In general, the polyvalent alcohol fatty acid ester in which the fatty acid portion is saturated has a high melting point and is in a solid state at room temperature. Its use in a relatively large amount results in bleeding out onto the surface of the magnetic layer to produce whitening, which will cause drop-out. Thus, its use is to be limited to a relatively small amount. On the other hand, the polyvalent alcohol fatty acid ester in which the fatty acid portion is unsaturated is usually in a liquid state at room temperature. It may be employed in a relatively large amount since no whitening is casued thereby. While the polyvalent alcohol portion may be chosen from glycerol, erythritol, pentaerythritol, arabitol, sorbitol, sorbitan, mannitol, mannitan, trimethylolethane, trimethylolpropane, trimethylolbutane, trimethylolpentane, trimethylolhexane, etc, the fatty acid portion may be chosen from butyric acid, caproic acid, caprylic acid, capric acid, lauric acid, myristic acid, palmitic acid palmitoleic acid, stearic acid, oleic acid, linoleic acid, linolenic acid, alpha-eleostearic acid, ricinoleic acid, gadoleic acid, arachidonic acid, behenic acid, etc. Specific examples of the polyvalent alcohol fatty acid ester are glycerol tristearate, glycerol trioleate, trimethylolpropane tristearate, trimmethyolpropane trioleate, pentaerythritol tetrastearate, and pentaerythritol tetraoleate.

The amount of the polyvalent alcohol fatty acid ester to be incorporated into the magnetic layer is usually from 0.01 to 40% by weight based on the weight of the magnetic powder. When the amount is less than 0.01 % by weight, the wear resistance at an elevated temperature is not sufficiently improved. When more than 40% by weight, bleeding-out occurs at the surface of the magnetic layer so that the spacing between the magnetic head and the surface of the magnetic layer is increased and the output is lowered.

Since the polyvalent alcohol fatty acid ester is, in general, compatible with other lubricants, it may be used with any lubricant in combination. When, for instance, it is used together with an ester of a monovalent alcohol and a fatty acid, the wear-resistance is improved not only at a high temerature but also at a low temperature. The monovalent alcohol fatty acid ester may comprise usually from 10 to 50 carbon atoms in total, and its specific examples are oleyl oleate, octyl oleate, and n-butyl oleate. In general, the use of the monovalent alcohol fatty acid ester in which the fatty acid portion is unsaturated is preferred. In case of the other lubricant such as the monovalent alcohol fatty acid ester being used, the amount of such other lubricant may be 99 parts by weight or less to one part by weight of the polyvalent alcohol fatty acid ester. The use of the other lubricant in a higher amount is not desirable, because the technical effect, i.e. the improvement of the wear-resistance at an elevated temperature, due to the polyvalent alcohol fatty acid ester, is lost. When the other lubricant is used in addition to the polyvalent alcohol fatty acid ester, the total amount of them may be usually from 1 to 40% by weight based on the wieght of the magnetic powder.

Still, various kinds of the polyvalent alcohol fatty acid esters and, if used, of the other lubricant may be respectively employed alone or in combination.

For formation of a magnetic layer comprising the polyvalent alcohol fatty acid ester as the lubricant, there may be adopted any per se conventional procedure. For instance, the polyvalent alcohol fatty acid ester and, if used, any other lubricant, are dissolved in an appropriate solvent or solvent mixture (e.g. n-hexane, methanol, ethanol, isopropanol, freon) to make a lubricant solution, and this lubricant solution may be coated or sprayed onto a magnetic layer comprising magnetic powder as previously prepared. Alternatively, the magnetic layer may be dipped in such a lubricant solution. Further, magnetic powder and a resinous binder may be incorporated into the lubricant solution to make a magnetic coating composition, which is applied onto a substrate to form a magnetic layer. When desired, the thus formed magnetic layer may be subjected to super-calendering or polishing at the surface.

As the magntic powder, there may be used metallic iron, metallic cobalt, iron or cobalt alloy, gamma-$Fe_2O_3$, $Fe_3O_4$, intermediary oxide of iron or cobalt or its cobalt-modified product, barium ferrite or the like.

Examples of the resinous binder are vinyl chloride resin, vinyl acetate resin, vinyl chloride/vinyl acetate copolymer, vinyl chloride/vinyl acetate/vinyl alcohol copolymer, polyurethane resin, cellulose resin, polyester resin or its sulfonated product, vinylidene chloride/acrylonitrile copolymer, acrylonitrile/butadiene copolymer, isoprene rubber, butadiene rubber, etc. In addition, the magnetic coating composition or the magnetic layer may comprise any other additive such as a hardener (e.g. low molecular weight isocyanate compound).

PREFERRED EMBODIMENTS

Practical and presently preferred embodiments of the invention are illustratively shown in the following examples wherein part(s) are by weight unless otherwise indicated.

EXAMPLE 1

For preparation of a magnetic coating composition, the following materials were used:

| Composition | Part(s) |
| --- | --- |
| Co-containing gamma-$Fe_2O_3$ magnetic powder | 1000 |
| alpha-$Fe_2O_3$ powder | 100 |
| "HS-500" (carbon black; manufactured by Asahi Carbon K.K.) | 150 |
| "RSI" (nitrocellulose; manufactured by Daicell Ltd.) | 156 |
| "H12000" (polyurethane resin; Dainippon Ink and Chemicals, Ltd.) | 156 |
| "Coronate L" (trifunctional low molecular weight polyisocyanate compound; manufactured by Nippon Polyurethane Co., Ltd.) | 78 |
| Pentaerythritol tetrastearate | 10 |
| Cyclohexanone | 2000 |
| Toluene | 2000 |

The above materials were well mixed in a ball mill to prepare a magnetic coating composition. The coating composition was applied to both surfaces of a polyester base film of 75μ in thickness to form a magnetic layer having a thickness of about 1.1μ (after drying) on each surface and dried, followed by punching into a round disk form to obtain a magnetic recording disc.

EXAMPLE 2

Preparation of a magnetic recording disc was carried out in the same manner as in Example 1 but using glycerol tristearate (10 parts) instead of pentaerythritol tetrastearate.

EXAMPLE 3

Preparation of a magnetic recording disc was carried out in the same manner as in Example 1 but using trimethylolpropane trioleate (10 parts) instead of pentaerythritol tetrastearate.

EXAMPLE 4

Preparation of a magnetic recording disc was carried out in the same manner as in Example 1 but using trimethylolpropane tristearate (10 parts) instead of pentaerythritol tetrastearate.

EXAMPLE 5

Preparation of a magnetic recording disc was carried out in the same manner as in Example 1 but using pentaerythritol tetraoleate (10 parts) instead of pentaerythritol tetrastearate.

EXAMPLE 6

Preparation of a magnetic recording disc was carried out in the same manner as in Example 1 but additionally incorporating oleyl oleate (100 parts) into the magnetic coating composition.

EXAMPLE 7

Preparation of a magnetic recording disc was carried out in the same manner as in Example 1 but additionally incorporating octyl oleate (100 parts) into the magnetic coating composition.

EXAMPLE 8

Preparation of a magnetic recording disc was carried out in the same manner as in Example 1 but additionally incorporating stearic acid (10 parts) into the magnetic coating composition.

EXAMPLE 9

Preparation of a magnetic recording disc was carried out in the same manner as in Example 1 but additionally incorporating oleic acid (10 parts) into the magnetic coating composition.

EXAMPLE 10

Preparation of a magnetic recording disc was carried out in the same manner as in Example 1 but additionally incorporating liquid paraffin (100 parts) into the magnetic coating composition.

EXAMPLE 11

Preparation of a magnetic recording disc was carried out in the same manner as in Example 1 but using trimethylolpropane tristearate (10 parts) instead of pentaerythritol tetrastearate and additionally incorporating octyl oleate (100 parts) into the magnetic coating composition.

EXAMPLE 12

Preparation of a magnetic recording disc was carried out in the same manner as in Example 1 but using trimethylolpropane tristearate (10 parts) instead of pentaerythritol tetrastearate and additionally incorporating oleyl oleate (100 parts) into the magnetic coating composition.

EXAMPLE 13

Preparation of a magnetic recording disc was carried out in the same manner as in Example 1 but using glycerol trioleate (10 parts) instead of pentaerythritol tetrastearate and additionally incorporating oleyl oleate (100 parts) into the magnetic coating composition.

COMPARATIVE EXAMPLE 1

Preparation of a magnetic recording disc was carried out in the same manner as in Example 1 but using n-butyl stearate (10 parts) instead of pentaerythritol tetrastearate.

Every fourteen samples of the magnetic recording discs obtained in each of Examples 1 to 13 and Comparative Example 1 were each placed into a jacket for dust prevention and then set in a recording-reproducing apparatus for testing the durability. Each magnetic recording disc was subjected to recording at 5° or 40° C. while contacting with the magnetic head under the following conditions: head pressure, 40 g; running speed, 300 rpm; circumferential speed, 1 m/sec; write frequency, 125 KHz. The running (rotation) times until the reproducing output decreased to 70% of the initial output were counted.

The results are shown in Table 1.

TABLE 1

|  | Running times ($\times 10^4$) | |
|---|---|---|
|  | 5° C. | 40° C. |
| Example | | |
| 1 | 369 | 984 |
| 2 | 372 | 982 |
| 3 | 431 | 923 |
| 4 | 360 | 977 |
| 5 | 428 | 910 |
| 6 | 1230 | 981 |
| 7 | 1222 | 984 |
| 8 | 369 | 1045 |
| 9 | 492 | 1105 |
| 10 | 490 | 976 |
| 11 | 1228 | 1229 |
| 12 | 1232 | 1227 |
| 13 | 1234 | 1240 |
| Comparative | | |
| 1 | 497 | 120 |

As can be seen in Table 1, the magnetic recording discs of the invention (Examples 1 to 13) are greater in running times than conventional magnetic recording discs (Comparative Example 1), particularly at 40° C. Accordingly, it may be said that the magnetic recording discs of the invention are excellent in wear-resistance and durability at an elevated temperature.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:
1. A magnetic recording medium which comprises a substrate and a magnetic layer formed on at least one surface thereof comprising magnetic powder, a resinous binder and an ester of a polyvalent alcohol with a fatty acid and an ester of a monovalent alcohol with an unsaturated fatty acid.

2. The magnetic recording medium according to claim 1, which magnetic recording medium comprises a magnetic recording disc.

3. The magnetic recording medium according to claim 1, wherein the monovalent alcohol ester is oleyl oleate.

4. The magnetic recording medium according to claim 1, wherein said polyvalent alcohol portion in said corresponding ester is selected from at least one member of the group consisting of glycerol, erythritol, pentaerythritol, arabitol, sorbitol, sorbitan, mannitol, mannitan, trimethylolethane, trimethylolpropane, trimethylolbutane, trimethylolpentane and trimethylolhexane.

5. The magnetic recording medium according to claim 1, wherein said ester of a polyvalent alcohol is glycerol trioleate.

6. The magnetic recording medium according to claim 1, wherein the monovalent alcohol ester is octyl oleate.

7. The magnetic recording medium according to claim 1, wherein the total amount of the esters is from about 1 to 40% by weight of the magnetic powder.

8. The magnetic recording medium according to claim 1, wherein the amount of the monovalent alcohol ester is from about 99 parts by weight or less to one part by weight of the polyvalent alcohol ester.

9. The magnetic recording medium according to claim 1, wherein the polyvalent alcohol ester is trimethylolpropane tristearate.

10. The magnetic recording medium according to claim 1, wherein the polyvalent alcohol ester is pentaerythritol tetrastearate.

11. The magnetic recording medium according to claim 1, wherein the unsaturated fatty acid in the monovalent alcohol ester is oleic acid.

* * * * *